United States Patent

[11] 3,617,887

[72] Inventor Harold David Alcaide
Bedford, Mass.
[21] Appl. No. 722,257
[22] Filed Apr. 18, 1968
[45] Patented Nov. 2, 1971
[73] Assignee Continental Electronics Manufacturing Co.
Dallas, Tex.

[54] VOLTAGE-TO-CURRENT CONVERTER FOR DRIVING A METER MOVEMENT
4 Claims, 3 Drawing Figs.

[52] U.S. Cl............................................ 324/120, 324/123 R
[51] Int. Cl....................................... G01r 19/26, G01r 1/30
[50] Field of Search............................. 324/120, 123, 119, 132; 330/28, 26, 38; 328/144

[56] References Cited
UNITED STATES PATENTS

| | | | |
|---|---|---|---|
| 2,147,729 | 2/1939 | Wurmser.................... | 324/123 |
| 2,889,519 | 6/1959 | Montgomery et al......... | 324/123 X |
| 3,260,949 | 7/1966 | Voorhoeve.................. | 330/28 X |
| 2,944,218 | 7/1960 | Newbold..................... | 324/119 X |
| 3,311,826 | 3/1967 | Galman....................... | 324/119 X |
| 3,500,220 | 3/1970 | Buckley...................... | 330/38 X |

Primary Examiner—Rudolph V. Rolinec
Assistant Examiner—Ernest F. Karisen
Attorney—James D. Willborn ABSTRACT: An alternating voltage is converted linearly to an alternating current by circuitry which includes an amplifier operating as a first current source and responding to the alternating voltage. The collector current of the amplifier is composed of a direct component and an alternating component proportional, the latter being proportional to the alternating voltage. The two components are split into two separate lines connected to the collector. One line connects to a second constant-current generator which accepts only the direct component. The other line is the output line and contains a capacitor which accepts only the alternating component proportional to the alternating voltage. The proportional current in the output line may be rectified to operate a DC meter, and the response of the rectifier circuit is linear essentially to zero, while the complexity of the circuitry is substantially reduced with respect to conventional circuits.

PATENTED NOV 2 1971

Inventor
Harold David Alcaide
by Roberts Cushman & Grover,
Attys.

3,617,887

VOLTAGE-TO-CURRENT CONVERTER FOR DRIVING A METER MOVEMENT

BACKGROUND OF THE INVENTION

Field of the Invention

The invention relates to circuits for converting alternating voltages to proportional alternating currents, such as are found in AC voltmeters.

Circuitry is now used, for example in AC voltmeters, to convert an alternating voltage to a linearly related current capable of rectification for driving simple DC meters, for example of the D'Arsonval movement type. At present, such circuitry is quite complex if a suitably linear response to 0 or near-0 amperes is expected. It is not unusual to find as many as five triode or pentode stages (or equivalents) employed for linearity. This complexity is expensive and susceptible to breakdown. Moreover, the use of multistage amplifiers results in narrowing of bandwidth, thus reducing the potential usefulness of the instrument where they are employed. Furthermore, despite these efforts, accurate linear operation is difficult to obtain near 0 because of poor characteristics of typical voltage-driven rectifiers near the 0 switching point.

SUMMARY OF THE INVENTION

An object of the present invention is to provide improved circuitry, for converting alternating voltages to proportional currents, which circuitry is capable of providing a linear response over a wide bandwidth and which is simple and inexpensive in construction.

An additional object of the invention is to provide simplified circuitry for rectifying AC signals with improved response at near-0 amperes.

Still another object is to provide improved circuitry for driving direct current operated meter movements.

According to the invention, the circuit comprises amplifier means operating as a first current source and responding to the input alternating voltage to produce a composite current having an alternating component proportional to the input voltage and a direct component. In one highly practical aspect, the amplifier is a high-gain transistor connected in an emitter-follower configuration with negative feedback, supplied by an emitter-resistor, with the collector current composed of the composite current.

Means are provided for segregating the alternating component from the composite current and directing it into an output line for application to a load. Such means comprise, in a further aspect, a bypass line, connected both to the output line and to the composite current line at a common node, to provide a path for the direct component. There are mans such as a capacitor in the output line for admitting the alternating component and excluding the direct component and means in the bypass line for admitting the direct component and for excluding the alternating component. The bypass line means can be an impedance, e.g. a resistor, substantially larger than the AC impedance of the output line capacitor and preferably includes a constant-current generator supplying a direct current to accept said direct component.

In one quite practical specific embodiment, the current in the output line, which is proportional to the input alternating voltage, flows through a diode for rectification to enable it to operate a DC meter. Because the diode is current driven, it rectifies very accurately.

These and other novel features and advantages of the invention will become apparent from the following illustrative description of practical embodiments.

DESCRIPTION OF THE PREFERRED EMBODIMENTS

Figure 1:
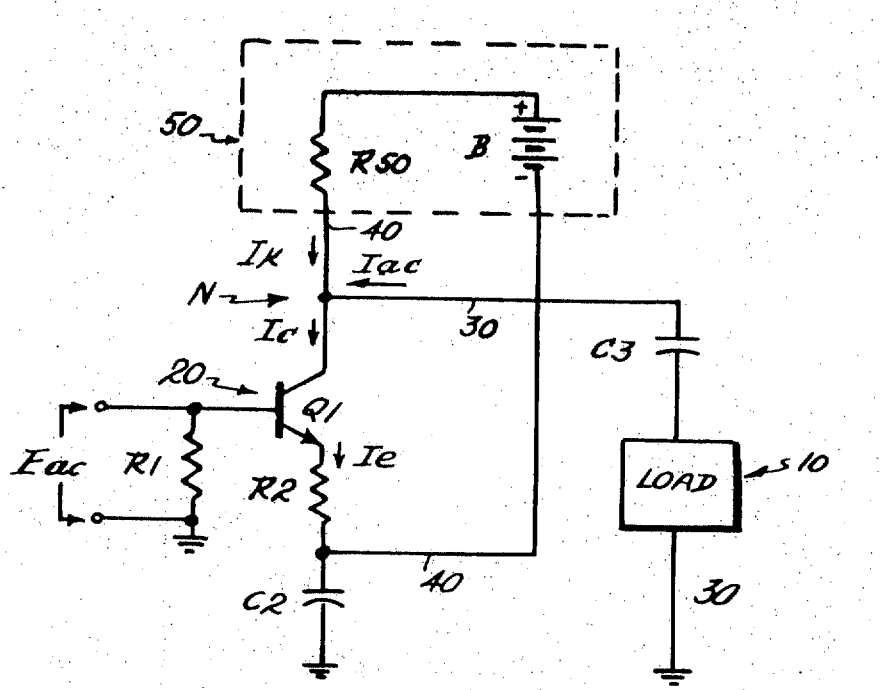
FIG. 1 is a schematic diagram of a circuit according to the invention.
Figure 2:
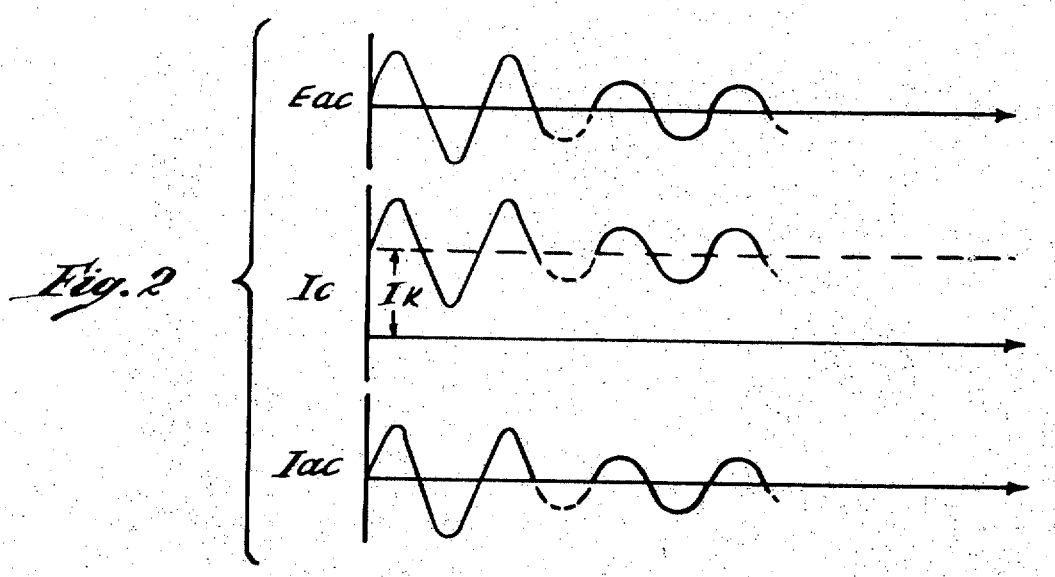
FIG. 2 is a graph illustrating signals at indicated points in the circuit of FIG. 1.

FIGS. 1 and 2 illustrate the principles of the and operation of the invention. The alternating voltage, Eac, which is to be converted to a linearly related, alternating current, Iac, through a load 10, is applied to amplifier 20 across its input resistor R1. Amplifier 20, comprising transistor Q1 with emitter-resistor R2 supplying negative feedback, acts as an emitter-follower and is therefore characterized by a unity voltage gain. Accordingly, substantially all of the alternating voltage, Eac, applied across R1 will be impressed across R2, superimposed on a direct voltage due to biasing of transistor Q1. Since resistance R2 is a linear element, the emitter current, Ie, of transistor Q1 will be related to the input alternating voltage, Eac, as follows:

$$Ie = (Eac/R2) + Is$$

where $Is$ is a constant, bias current. The variable portion of the emitter current is: $ie = Eac/R2$. By choosing Q1 so that it has a high current gain, most of this current will flow through the collector of Q1. For example, if Q1 has a base-to-collector current gain of 50, then the variable collector current, $ic$, is related to emitter current, $ie$, as follows: $ic = (50/50+1)$; $i_a = 0.98$, or $ie \cong ic$. Thus, the variable portion of the collector current is proportional to the variable portion of the emitter with respect to linearity.

The total current, $Ic$, through the collector of transistor Q1 is a composite having an alternating component, $Iac$, that is proportional to the input, alternating voltage, $Eac$, and a direct component, $Ik$, due to biasing, or $Ic = Iac + Ik$, where $Iac = Eacb/R2$.

Connected to the collector of transistor Q1 at a common node N are an output line 30 adapted to carry the alternating component, $Iac$, and a DC bypass or bias line 40 adapted to carry the direct component $Ik$. Output line 30 is provided with a capacitor C3 which effectively blocks passage of the direct component, $Ik$, but admits the alternating component, $Iac$, to load 10.

In bypass line 40, there is provided a circuit 50 which acts to pass direct current while excluding alternating current. In the embodiment of FIG. 1, circuit 50 comprises, in series with a biasing battery B, a resistor R50 whose impedance is selected to be large compared to the AC impedance of capacitor C3, so that substantially all the alternating component, $Iac$, will pass into output line 30 to load 10.

As shown, DC bypass line 40 is connected at its other end to the junction of resistor R2 and capacitor C2, the latter serving to isolate the direct component, $Ik$, from ground and from the load 10 and output line 30 connected at its other end to ground. Capacitor C2 should be selected to have an AC impedance small compared to that of R2, so that substantially all of the alternating voltage Eac, is impressed across R2 while a relatively small current, one that is proportional to the voltage Eac, is applied to the load 10.

In effect, lines 30 and 40 form two parallel loops having a common portion through transistor Q1 and resistor R2: the transistor responds to Eac to generate a composite current with alternating and direct components, and the components are separated and directed around the two loops, the alternating component in one (output) loop and the direct in the other (bypass) loop.

In operation, the circuit 50 comprises a current source having an impedance an order of magnitude greater than the impedance of the amplifier 20, which also functions as a current source. With the circuit 50 in a parallel arrangement with the amplifier 20, the impedance of the circuit looking into the node N will be essentially that of the amplifier 20. This impedance is selected to be much greater than that of the load 10.

Assume that the circuit 50 generates a DC current established by the battery B and the resistor R50. This current will remain essentially constant for a variation in the impedance of the amplifier 20, which in effect is in series with the resistor R50. For example, if the value of the resistor R50 is 10 times greater than the impedance of the amplifier 20, then, since the amplifier 20 is in series with the resistor R50, variations in the impedance of the former will result in essentially no change in the current from the circuit 50. Similarly, if the impedance of the parallel arrangement of the circuit 50 and the amplifier 20, as viewed from the load 10, is considerably greater than the impedance of the load, then variations in the load impedance will have a minimum effect on the current through the transistor Q1.

Consider now the results of applying an AC signal across the resistor R1. A current produced by the circuit 50 produces a current flow through the collector-emitter junction by the transistor Q1 with no signal applied across the resistor R1. Variations in the impedance of the transistor Q1 will have a minimum effect on the current of the circuit 50. When a signal is applied across the resistor R1, a proportional voltage is developed across the resistor R2. This produces a current flow in the resistor R2 which is a composite of the output current of the circuit 50 and that resulting from the applied signal. This composite current is reflected through the collector-emitter junction of the transistor Q1 to the node N. Since the circuit 50 produces a current essentially independent of the impedance from the node N to ground, a variation in the current through the transistor Q1 causes a division of the current at the node N. One component of the current will be applied through the line 30 to the load 10, and the other appears across the collector-emitter junction of the transistor Q1. In effect, the load 10 and the amplifier 20 are in a parallel circuit, and a variation in the impedance of the amplifier 20 causes a change in the current flow through the parallel circuit including the load 10. Thus, a change in current in the transistor Q1 as a result of a signal applied across the resistor R1 will be reflected as a current change through the load 10.

The circuit of FIG. 1 can be modified in several respects for convenience or to improve performance. For example, transistor Q1 can be replaced with a cascade pair for improved, high-frequency performance. Other negative-feedback amplifiers can be used to furnish the required composite current. Resistor R2 can be replaced with a more-complex frequency-sensitive network to compensate for stray capacities and other frequency variable effects.

Figure 3:
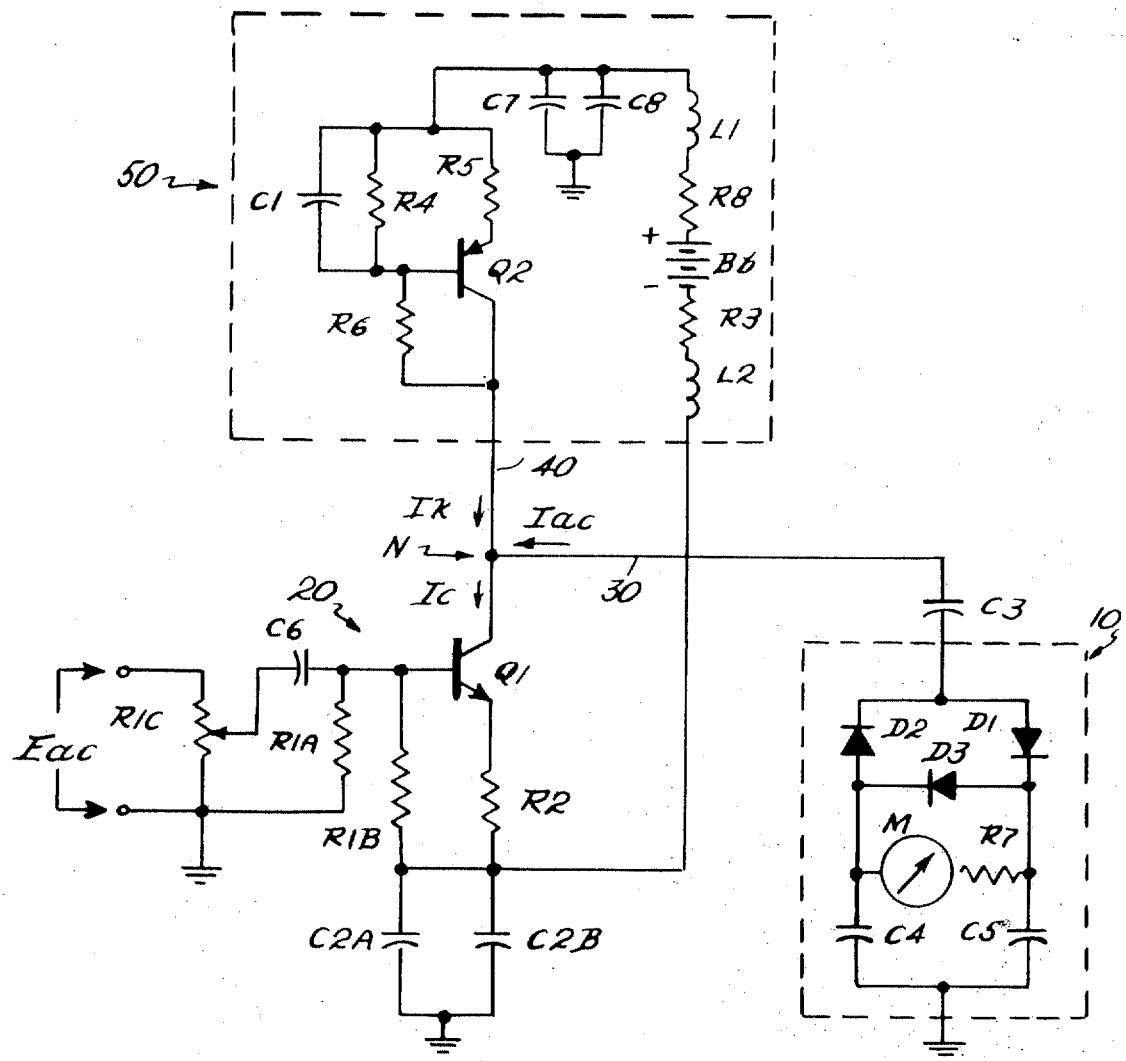
FIG. 3 is a schematic diagram of another circuit according to the invention.

In addition, circuit 50 can be replaced with a constant-current generator to eliminate the need for a high-voltage biasing battery, to provide better DC acceptance, and to provide AC exclusion characteristics of bypass line 40. This modification is illustrated in FIG. 3, which shows a highly practical example of the invention. It repeats the identification of duplicated elements from FIG. 1.

In the example of FIG. 3, the circuit 50 comprises a battery Bb supplying power to transistor Q2 through an emitter-resistor R5. As illustrated, transistor Q2 is of type PNP, complementary to the NPN-construction of Q1, and has its collector connected to the collector of Q1.

Capacitor C1 bypasses the base of Q2 to filter out any alternating current from the base. Consequently, transistor Q2 supplies only a constant current to the collector of Q1 and behaves as a constant-current generator. The value of the current, I$k$, is determined by R4, R5 and R6, and is selected to keep Q1 operating properly at a suitable quiescent point. Since Q2 passes constant current and R6 is large, substantially all the alternating current flowing through the collector of Q1 must enter output line 30 through capacitor C3, as desired.

More specifically, Q2 is a constant-current generator whose DC current level is set by R4, R5, and R6 to maintain its collector voltage at approximately DC ground. Since C1 bypasses the base there can be no AC voltage on the base of Q2, and hence, no AC voltage on the emitter of Q2. This means that there is no AC current in R5 and that there can be no AC current in the emitter nor in the collector leads of Q1. The input voltage, $E_{ac}$, is coupled to potentiometer R25 to the base of Q1. Q1 acting as an emitter-follower causes this signal to appear across R2. Since R2 is a linear resistor, its current is proportional to the voltage across it, and since Q1 is a high-gain transistor, its collector current is very nearly equal to emitter current. Thus, the AC current out of the collector of Q1 is proportional to the AC voltage at the input. Since Q2 cannot accept an AC current, all of this current must pass through C3 into D1 and D2 where it is rectified to drive the meter M.

FIG. 3 further illustrates the application of the converter circuit to drive a meter. As shown in FIG. 3, the load 10 includes a DC meter M, rectifier diodes D1 and D2, meter overload protection diode D3, and clamper capacitors C4 and C5 charged by the rectified current to operate the meter. Because diodes D1 and D2 are current driven they switch very accurately, and their forward volt-ampere characteristics near 0 voltage do not adversely affect the magnitude of current to be supplied to meter M. An accurate linear response is therefore obtained. These and further modifications shown in FIG. 3 will by fully understood from FIG. 3, which clearly shows the nature and electrical connections of each of the circuit components, and from the following list, which fully identifies the exact structural characteristics or dimensions or ratings so far as material for the proper operation of the device, referring to the numerals of the figure. It is to be understood that adjustments and mutual correlations may have to be applied upon initial testing for proper performance, according to routine practice in the manufacture of devices of this type.

| R1A | 100 | kohms |
|---|---|---|
| R1B | 27 | kohms |
| R1C | 5 | kohms potentiometer |
| R2 | 1 | kohms |
| R3 | 10 | ohms |
| R4 | 27 | kohms |
| R5 | 1 | kohms |
| R6 | 100 | kohms |
| R7 | 300 | ohms |
| R8 | 10 | ohms |
| C1 | 1 | microfarad |
| C2A | 0.01 | microfarad |
| C2B | 15 | microfarad |
| C3 | 0.01 | microfarad |
| C4 | 1 | microfarad |
| C5 | 1 | microfarad |
| C6 | 0.01 | microfarad |
| C7 | 0.01 | microfarad |
| C8 | 15 | microfarad |
| L1 | 100 | microhenries |
| L2 | 100 | microhenries |
| Q1 | 2N2222 | |
| Q2 | 2N2907 | |
| D1,D2 | 1N270 | |
| D3 | 1N814 | |
| M | 0–200 | microamperes, |
| | 690 | ohms, 0–3 volts AC |

A circuit according to FIG. 3 with components as given in the foregoing list was constructed and tested. In the frequency band 50–140 kHz., test results showed zero-based linearity to be better than ±1.0 percent, which is an example of the linearity attainable with the invention.

It should be understood that the present disclosure is for the purpose of illustration only and that this invention includes all modificatons and equivalents falling within the scope of the appended claims.

I claim:

1. A system for driving a meter movement with a current signal proportional to an AC input signal, comprising:
   a current amplifier including a transistor having a base electrode receiving the AC input signal and having an output impedance greater than the impedance of the meter movement,
   a DC current source in a parallel arrangement with the collector-emitter junction of the transistor of said current amplifier, said source having an impedance greater than the impedance of said amplifier and producing a current through the collector-emitter junction that varies with the AC input signal,
   circuit means for connecting the meter movement in parallel with said amplifier and to said DC current source such that a current through the meter movement varies with the AC input signal, means for blocking the DC current of said source from the meter movement, and means connected to said current amplifier for isolating the DC current source from ground.

2. A system for driving a meter movement as set forth in claim 1 wherein said circuit means includes rectifier means for providing a DC signal corresponding to the AC input signal to the meter movement.

3. A system for driving a meter movement as set forth in claim 1 wherein said current amplifier includes a resistor in the emitter electrode circuit for establishing the collector-emitter function current that varies with the applied AC input signal.

4. A system for driving a meter movement as set forth in claim 1 wherein said DC current source includes a transistor having a collector electrode connected to the collector electrode of said current amplifier, and a capacitor bypassing the base of said transistor to filter AC currents therefrom.

* * * * *